(12) United States Patent
Takizawa

(10) Patent No.: US 9,130,476 B2
(45) Date of Patent: Sep. 8, 2015

(54) POWER SEMICONDUCTOR DEVICE AND POWER CONVERSION SYSTEM USING THE DEVICE

(75) Inventor: Satoki Takizawa, Hino (JP)

(73) Assignee: FUJI ELECTRIC CO., LTD. (JP)

(*) Notice: Subject to any disclaimer, the term of this patent is extended or adjusted under 35 U.S.C. 154(b) by 869 days.

(21) Appl. No.: 13/043,012

(22) Filed: Mar. 8, 2011

(65) Prior Publication Data

US 2011/0242866 A1  Oct. 6, 2011

(30) Foreign Application Priority Data

Apr. 6, 2010 (JP) ................. 2010-087469

(51) Int. Cl.
*H02M 7/537* (2006.01)
*H02M 7/487* (2007.01)
*H02M 7/00* (2006.01)

(52) U.S. Cl.
CPC ............. *H02M 7/487* (2013.01); *H02M 7/003* (2013.01)

(58) Field of Classification Search
CPC ............................ H02M 7/487; H02M 7/003
USPC .................. 363/34, 35, 37, 40, 41, 55, 56.01, 363/56.02, 131, 132
See application file for complete search history.

(56) References Cited

U.S. PATENT DOCUMENTS

| | | | |
|---|---|---|---|
| 5,473,530 A * | 12/1995 | Giuseppe et al. | 363/131 |
| 5,953,222 A | 9/1999 | Mizutani | |
| 6,646,898 B2 * | 11/2003 | Furukawa et al. | 363/132 |
| 7,289,329 B2 | 10/2007 | Chen et al. | |
| 2002/0024129 A1 | 2/2002 | Hirahara et al. | |
| 2010/0039843 A1 * | 2/2010 | Takizawa | 363/131 |
| 2012/0018777 A1 | 1/2012 | Takizawa | |
| 2012/0119256 A1 | 5/2012 | Okita | |

FOREIGN PATENT DOCUMENTS

| | | |
|---|---|---|
| CN | 1173068 A | 2/1998 |
| CN | 1242604 A | 1/2000 |
| CN | 1333566 A | 1/2002 |
| JP | 2000-216331 A | 8/2000 |
| JP | 2002-231883 A | 8/2002 |
| JP | 2008-193779 A | 8/2008 |

OTHER PUBLICATIONS

"FUJI Power Semiconductors IGBT Modules" by Fuji Electric Device Technology Co., Ltd., Mar. 2010, PMJ01e.

(Continued)

*Primary Examiner* — Matthew Nguyen
*Assistant Examiner* — Afework Demisse
(74) *Attorney, Agent, or Firm* — Rossi, Kimms & McDowell LLP

(57) ABSTRACT

Aspects of the invention are related to a power semiconductor module applied to a multi-level converter circuit with three or more levels of voltage waveform. Aspects of the invention can include a first IGBT to which a diode is reverse parallel connected and a second IGBT having reverse blocking voltage whose emitter is connected to the emitter of the first IGBT are housed in one package, and each of the collector of the first IGBT, the collector of the second IGBT, and the connection points of the emitter of the first IGBT and the emitter of the second IGBT, is an external terminal.

5 Claims, 17 Drawing Sheets

(56) References Cited

OTHER PUBLICATIONS

Takizawa, Satoki et al. "Power Semiconductor Device and Power Conversion System using the Device," Specification and Drawings of unpublished related co-pending U.S. Appl. No. 13/042,999, filed Mar. 8, 2011, pp. 1-44.

Chinese Office Action for corresponding CN 201110061651.X, mail date May 6, 2014. English translation provided.

* cited by examiner

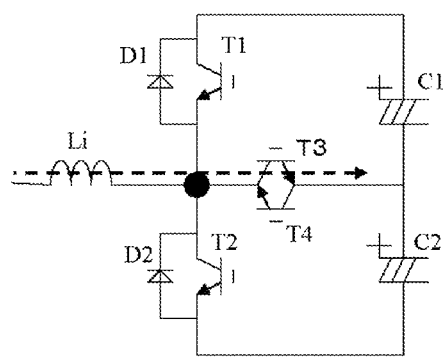
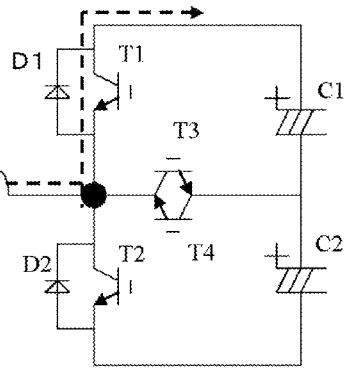
FIG. 14 A                    FIG. 14 B
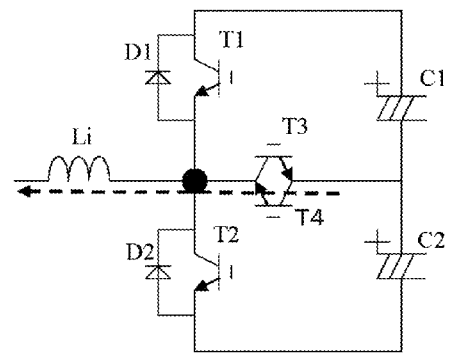
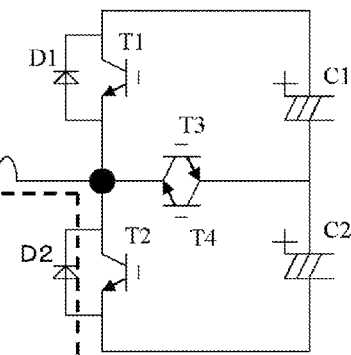
FIG. 14 C                    FIG. 14 D FIG. 17
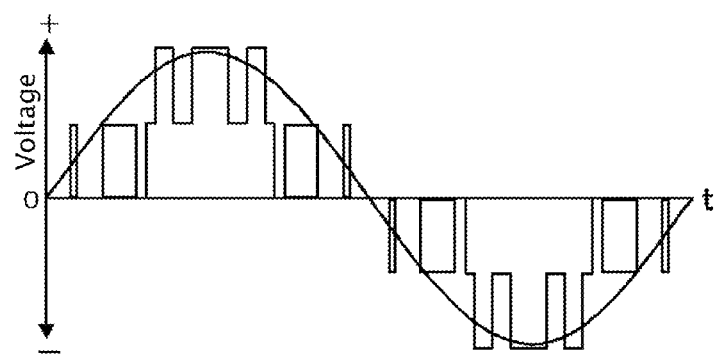
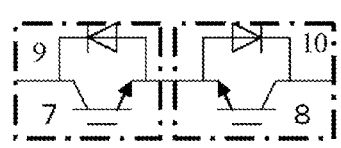
FIG. 18 A
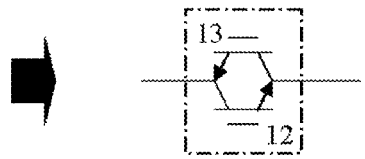
FIG. 18 B FIG. 19
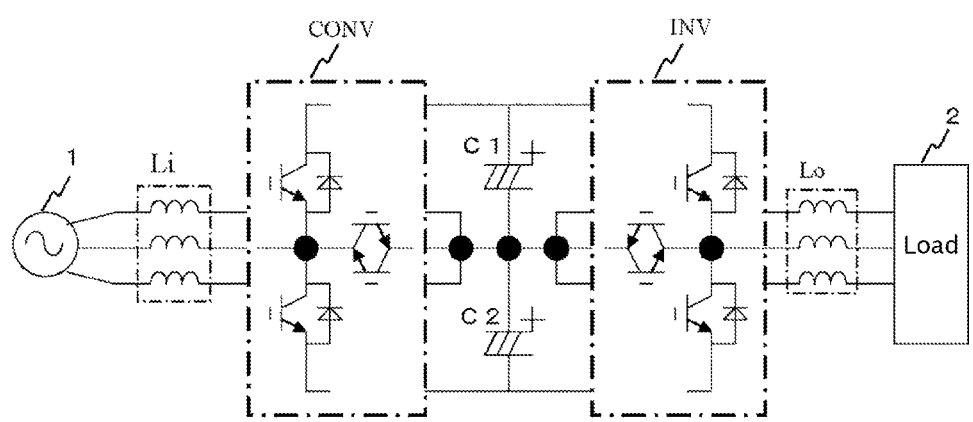
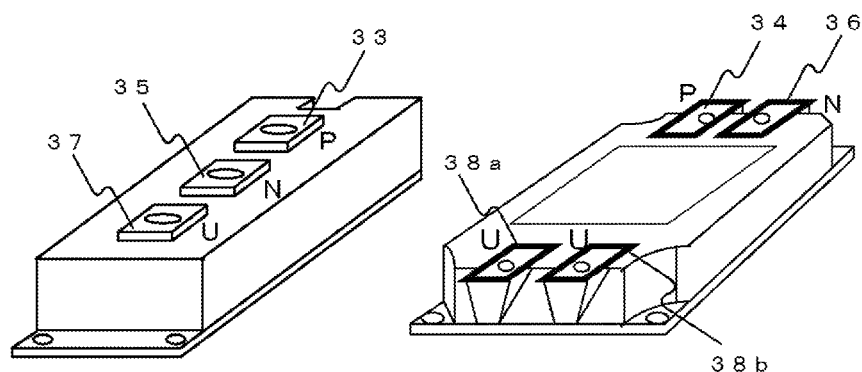
FIG. 20 A          FIG. 20 B

POWER SEMICONDUCTOR DEVICE AND POWER CONVERSION SYSTEM USING THE DEVICE

BACKGROUND OF THE INVENTION

1. Technical Field

Aspects of the present invention relate to a power semiconductor module or device applied to a multi-level power conversion device of three levels or more, and to a power conversion device to which the module is applied.

2. Related Art

FIG. 16 shows an example of a circuit of a three level inverter, which is a power conversion circuit that converts from a direct current to an alternating current. In a direct current power source in which C1 and C2 are connected in series (a large capacity capacitor may be used instead), a positive side potential is Cp, a negative side potential is Cn, and intermediate point potentials are Cm (Cm1 and Cm2). Generally, when the direct current power source is configured from an alternating current power source system, it is possible to configure by applying a rectifier, a large capacity electrolytic capacitor, or the like.

An upper arm is configured of an IGBT 3 and a diode 4 connected to the positive side potential Cp, and a lower arm of an IGBT 5 and a diode 6 connected to the negative side potential Cn. The upper arm and lower arm are connected in series, configuring a one phase arm 24. Phase arms 25 and 26 also having the same configuration, a three phase circuit is configured of the three phase arms. Also, reference numerals 7, 8, 9, and 10 are elements configuring a bidirectional switch connected between the direct current power supply intermediate point potential Cm and an alternating current output terminal 11, wherein 7 and 8 are IGBTs, and 9 and 10 are diodes. The bidirectional switch shown in FIG. 16 is of a configuration wherein IGBTs to which a diode is reverse parallel connected are connected in reverse series, and is applied to each phase. In the drawing, the IGBT 7 and IGBT 8 are connected in reverse series with a common emitter, but the switch can also be realized with a common collector configuration or, as shown in FIG. 18B, with a configuration wherein IGBTs 12 and 13 having reverse blocking voltage are reverse parallel connected.

Lo is a filter reactor, and 2 is a load of the system. By adopting this circuit configuration, it is possible to output the direct current power source positive side potential Cp, negative side potential Cn, and intermediate point potential Cm, to the output terminal 11. That is, the circuit is a three level inverter circuit that outputs three levels of voltage waveform. FIG. 17 shows an example of an output voltage (Vout) waveform. A characteristic being that there are less low order harmonic components (close to a sinusoidal waveform) than with a two level inverter, it is possible to miniaturize the output filter reactor Lo.

Also, FIG. 19 shows a double converter type of power conversion system configured of a PWM converter (CONV) that converts alternating current to direct current and a PWM inverter (INV) that converts direct current to alternating current. A configuration is such that, with a three phase alternating current power source 1 as an input, a stable alternating current voltage is generated by an input filter reactor Li, the three phase three level PWM converter CONV, large capacity capacitors C1 and C2 connected in series, the three phase three level PWM inverter INV, and an output filter Lo, and alternating current power is supplied to a load 2.

When configuring the three level converter circuit (converter or inverter) shown in FIG. 16 with current commercially available IGBT modules, the phase arms 24, 25, and 26 are configured with a 2 in 1 type of IGBT module, and bidirectional switch IGBT modules 27 to 32 with a 1 in 1 type of IGBT module. As an example of a 2 in 1 type of module, an appearance thereof is shown in FIGS. 20A and 20B, and an internal circuit configuration thereof in FIG. 21. FIG. 20A is a type wherein output terminals are installed in the upper portion of the module, and FIG. 20B is a type wherein output terminals are installed in end edge sides of the module. As the output terminals, there is a terminal P (33 and 34) connected to the direct current power source positive side potential Cp, a terminal N (35 and 36) connected to the negative side potential Cn, and a terminal U (37, 38a and 38b) connected to the load output and bidirectional switch elements, and the terminals are generally configured in the order shown in the drawings. Herein, as the terminal U has a larger current capacity than that of the terminal P and terminal N, it has a two terminal structure in FIG. 20B. Also, an example of a 1 in 1 type of module and an internal circuit configuration thereof are shown in FIGS. 22 and 23. The output terminals are configured of a collector terminal 39 and an emitter terminal 40.

FIG. 24 shows an example of a structural diagram (a top view) when configuring one phase of the circuit shown in FIG. 16 using these modules. The drawing shows an example configured of the type of module MJ2-1 (a 2 in 1 type) of FIG. 20A, the module MJ1-1 (a 1 in 1 type) shown in FIG. 22, and electrolytic capacitors C1 and C2 forming a direct current power source, each of which is wired by a copper bar (conductors A to E). The wiring form is inevitably complicated due to the terminal positions of the modules, and the wires between the modules (MJ2-1 and MJ1-1) and the electrolytic capacitors C1 and C2 are long. The tendency is the same when applying the type of module in FIG. 20B too.

A main circuit configuration of a three level inverter is shown in Japanese Patent Publication No. JP-A-2008-193779, and an external form and configuration diagram of a heretofore known module are shown in Non-patent Document 1: "FUJI Power Semiconductors IGBT Modules" by Fuji Electric Device Technology Co., Ltd., March, 2010, PMJ01e.

When the wires between the semiconductor modules and the direct current power source are long, as heretofore described, a problem occurs in that wire inductance increases, and a surge voltage at a time of a switching action becomes excessive.

FIG. 25 shows an equivalent circuit described focusing on the wire inductance of the one phase circuit of FIG. 16. Each inductor (L1 to L5) is mainly formed by the wires between the modules and between the modules and the direct current power source (the capacitors C1 and C2). As each wire is normally of the order of a few centimeters to around dozen centimeters, each inductance value is of the order of 10 nH to a few tens of nanohenrys.

In FIG. 25, with an IGBT 3 in an on condition, a current I with the path shown by the dotted line flows along a path from the direct current power source C1, through the inductor L1, the IGBT 3, and a reactor Lo, to the direct current power source C1. From this condition, on the IGBT 3 being turned off, an IGBT 7 (turned on in advance) and a diode 10 have continuity, and the current of the reactor Lo is transferred to a path 41 of the inductor L2, through the IGBT 7, the inductor L3, a diode 10, and the inductor L4, to the reactor Lo. At this time, a voltage is transiently generated in the directions of the arrows in the drawing in the inductors L1, L2, L3, and L4, in accordance with an IGBT current change rate (di/dt).

As a result of this, a maximum of the voltage shown in Equation 1 is applied between the collector and emitter of the IGBT 3. FIG. 26 shows waveforms of a collector current (ic) and a voltage between the collector and emitter ($V_{CE}$) when the IGBT 3 is turned off.

$$V_{CE(peak)} = Edp + (L1+L2+L3+L4) \cdot di/dt \quad \text{Equation 1}$$

$$\text{Surge voltage } \Delta V = (L1+L2+L3+L4) \cdot di/dt \quad \text{Equation 2}$$

Edp: direct current power source 1 direct current voltage
di/dt: IGBT current change rate when IGBT is turned off
L1, L2, L3, and L4: wire inductance value As one example, in the case of an IGBT in the few hundred ampere class, as the current change rate di/dt thereof is a maximum of around 5,000 A/μs, when L1+L2+L3+L4=100 nH, the surge voltage (L1+L2+L3+L4)·di/dt according to Equation 1 is 500V.

Consequently, due to the existence of L1, L2, L3, and L4, the value of the peak voltage applied to the IGBT when the IGBT is turned off is a high voltage value wherein the surge voltage in Equation 2 is added to the direct current voltage (Edp). As a result of this, elements with a high voltage rating are necessary for the IGBT chip and the diode chip connected in parallel thereto. Normally, a chip with a high amount of voltage resistance is such that the chip area increases roughly in proportion to the voltage rating, meaning that there is a problem in that the power semiconductor module increases in size, and the cost increases. Also, there is a problem in that a conversion device in which the power semiconductor module is used is also large, and is high-priced.

SUMMARY OF THE INVENTION

In order to solve the heretofore described problems, according to a first aspect of the invention, with a power semiconductor module such as an IGBT applied to a multi-level converter circuit with three or more levels of voltage waveform, a first IGBT to which a diode is reverse parallel connected and a second IGBT having reverse blocking voltage whose emitter is connected to the emitter of the first IGBT are housed in one package, and each of the collector of the first IGBT, the collector of the second IGBT, and the connection points of the emitter of the first IGBT and the emitter of the second IGBT, is an external terminal.

According to a second aspect of the invention, with a power semiconductor module such as an IGBT applied to a multi-level converter circuit with three or more levels of voltage waveform, a first IGBT to which a diode is reverse parallel connected and a second IGBT having reverse blocking voltage whose collector is connected to the collector of the first IGBT are housed in one package, and each of the emitter of the first IGBT, the emitter of the second IGBT, and the connection points of the collector of the first IGBT and the collector of the second IGBT, is an external terminal.

According to a third aspect of the invention, with a power semiconductor module such as an IGBT applied to a multi-level converter circuit with three or more levels of voltage waveform, a first IGBT to which a first diode is reverse parallel connected and a series circuit of a second IGBT and a second diode are housed in one package, and each of the collector of the first IGBT, the connection points of the emitter of the first IGBT and one end of the series circuit, and the other end of the series circuit, is an external terminal.

According to a fourth aspect of the invention, with a power semiconductor module such as an IGBT applied to a multi-level converter circuit with three or more levels of voltage waveform, a first IGBT to which a first diode is reverse parallel connected and a series circuit of a second IGBT and a second diode are housed in one package, and each of the emitter of the first IGBT, the connection points of the collector of the first IGBT and one end of the series circuit, and the other end of the series circuit, is an external terminal.

According to a fifth aspect of the invention, with a power semiconductor module such as an IGBT applied to a multi-level converter circuit with three or more levels of voltage waveform, a first IGBT to which a diode is reverse parallel connected and a second IGBT having reverse blocking voltage whose collector is connected to the emitter of the first IGBT are housed in one package, and each of the collector of the first IGBT, the emitter of the second IGBT, and the connection points of the emitter of the first IGBT and the collector of the second IGBT, is an external terminal.

According to a sixth aspect of the invention, with a power semiconductor module such as an IGBT applied to a multi-level converter circuit with three or more levels of voltage waveform, a first IGBT to which a diode is reverse parallel connected and a second IGBT having reverse blocking voltage whose emitter is connected to the collector of the first IGBT are housed in one package, and each of the emitter of the first IGBT, the collector of the second IGBT, and the connection points of the collector of the first IGBT and the emitter of the second IGBT, is an external terminal.

According to a seventh aspect of the invention, with a power semiconductor module such as an IGBT applied to a multi-level converter circuit with three or more levels of voltage waveform, a first IGBT to which a first diode is reverse parallel connected and a series circuit of a second IGBT and a second diode are housed in one package, and each of the collector of the first IGBT, the connection points of the emitter of the first IGBT and one end of the series circuit, and the other end of the series circuit, is an external terminal.

According to an eighth aspect of the invention, with a power semiconductor module such as an IGBT applied to a multi-level converter circuit with three or more levels of voltage waveform, a first IGBT to which a first diode is reverse parallel connected and a series circuit of a second IGBT and a second diode are housed in one package, and each of the emitter of the first IGBT, the connection points of the collector of the first IGBT and one end of the series circuit, and the other end of the series circuit, is an external terminal.

According to a ninth aspect of the invention, with the power semiconductor modules according to the first to eighth aspects of the invention, the external terminals drawn from the connection points of the first IGBT and second IGBT or from the connection points of the first IGBT and one end of the series circuit are installed on one edge side of the package, and the other external terminals are installed on another edge side opposing the one edge.

According to a tenth aspect of the invention, when the power semiconductor module according to the first aspect of the invention and the power semiconductor module according to the second aspect of the invention, wherein the external terminals drawn from the connection points of the first IGBT and second IGBT are installed on one edge side of the package and the other external terminals are installed on another edge side opposing the one edge, are applied to a semiconductor power conversion device, the modules are disposed adjacent to each other so that the terminals installed on the one edge side and the terminals installed on the other edge side face in the same respective directions.

According to an eleventh aspect of the invention, when the power semiconductor module according to the third aspect of the invention and the power semiconductor module according to the fourth aspect of the invention, wherein the external terminals drawn from the connection points of the first IGBT and one end of the series circuit are installed on one edge side of the package and the other external terminals are installed on another edge side opposing the one edge, are applied to a semiconductor power conversion device, the modules are disposed adjacent to each other so that the terminals installed on the one edge side and the terminals installed on the other edge side face in the same respective directions.

According to a twelfth aspect of the invention, when the power semiconductor module according to the fifth aspect of the invention and the power semiconductor module according to the sixth aspect of the invention, wherein the external terminals drawn from the connection points of the first IGBT and second IGBT are installed on one edge side of the package and the other external terminals are installed on another edge side opposing the one edge, are applied to a semiconductor power conversion device, the modules are disposed adjacent to each other so that the terminals installed on the one edge side and the terminals installed on the other edge side face in the same respective directions.

According to a thirteenth aspect of the invention, when the power semiconductor module according to the seventh aspect of the invention and the power semiconductor module according to the eighth aspect of the invention, wherein the external terminals drawn from the connection points of the first IGBT and the series circuit are installed on one edge side of the package and the other external terminals are installed on another edge side opposing the one edge, are applied to a semiconductor power conversion device, the modules are disposed adjacent to each other so that the terminals installed on the one edge side and the terminals installed on the other edge side face in the same respective directions.

By applying the modules of the invention, it is possible to reduce the wire inductance between the direct current unit circuit and power semiconductor modules in a multi-level conversion system that converts power from an alternating current to a direct current, or from a direct current to an alternating current, and it is possible to considerably curb the value of the surge voltage occurring when the IGBT or FWD (a free wheeling diode) switches. As a result of this, it is possible to apply an IGBT or diode chip with a low voltage rating, and it is possible to realize small, low-priced power semiconductor modules. Also, in a power conversion system to which these power semiconductor modules are applied, a reduction in the number of wires, a miniaturization of the system, and a reduction in cost, are possible.

BRIEF DESCRIPTION OF THE DRAWINGS

FIGS. 14A to 14D are illustrations of a commutation action of the current while the converter is in operation;

FIG. 17 shows an example of a three level inverter output voltage waveform;

FIGS. 18A and 18B show examples of a configuration of a bidirectional switch circuit;

FIG. 19 shows an example of a circuit configuration of an alternating current to alternating current conversion device with a converter+inverter configuration;

FIGS. 20A and 20B are external views of a power semiconductor module (a 2 in 1 type);

DETAILED DESCRIPTION OF CERTAIN EMBODIMENTS

The essence of the invention lies in configuring one phase of a converter circuit of three levels or more by combining two kinds of power semiconductor module incorporating one of the upper and lower arm IGBTs and one of the elements configuring the bidirectional switch as power semiconductor modules configuring one phase of a converter circuit of three levels or more wherein a bidirectional switch is connected between a series connection point of an upper and lower arm IGBT series circuit and a direct current power source intermediate point.

Working Example 1

Figure 1:
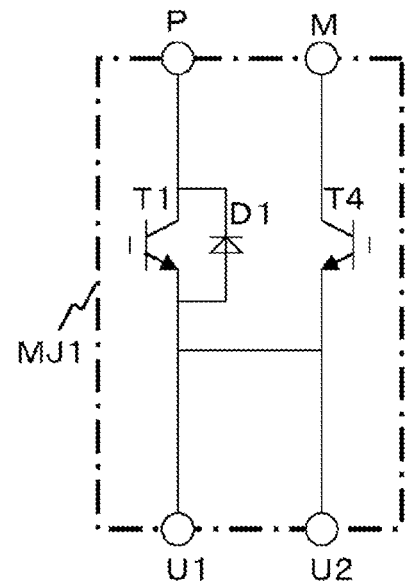
FIG. 1 shows a configuration of a power semiconductor module showing a first working example of the invention.
Figure 2:
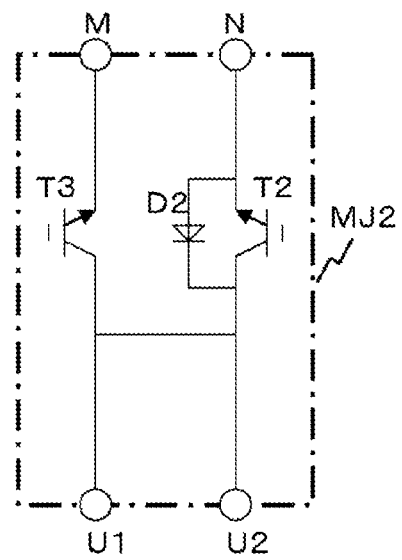
FIG. 2 shows a configuration of a power semiconductor module showing a second working example of the invention.
Figure 9:
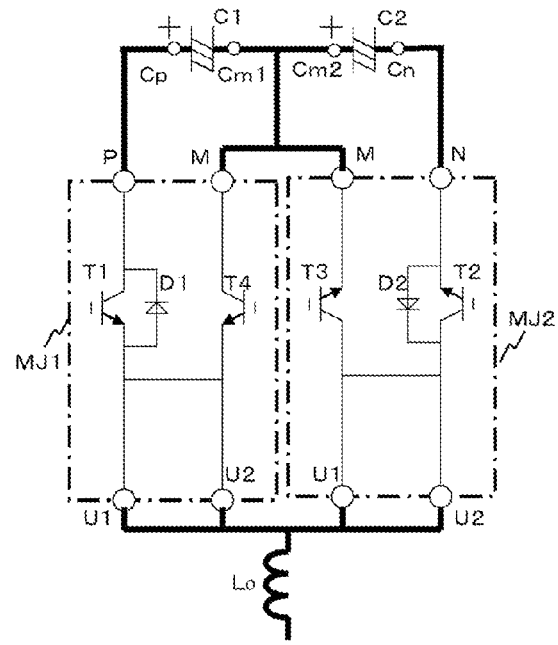
FIG. 9 shows a wiring example of modules and a direct current power source (capacitors) of the invention in an inverter.
Figure 10:
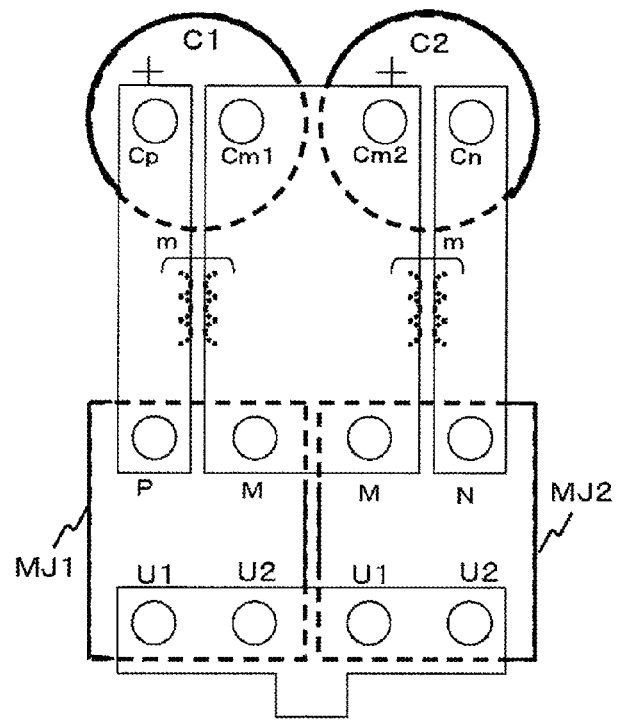
FIG. 10 shows a wiring structure example of modules and a direct current power source (capacitors) of the invention in the inverter.

FIGS. 1 and 2 show a first working example of the invention. FIGS. 1 and 2 corresponding to first and second aspects of the invention respectively, a semiconductor element connected to a potential Cm of a direct current power source is an IGBT having reverse blocking voltage, and the shape of the module is that of the type of module in FIG. 20B. FIGS. 9 and 10 are a working example when the modules are applied to a three level inverter (a converter from a direct current to an alternating current). A module MJ1 of FIG. 1, incorporating an IGBT T1 to which a diode D1 is reverse parallel connected and a bidirectional switch reverse blocking type IGBT T4, is of a configuration wherein the IGBT T1 collector is connected to a terminal P, the reverse blocking type IGBT T4 collector to a terminal M, and connection points of the reverse blocking type IGBT T4 emitter and IGBT T1 emitter to terminals U (U1 and U2).

A module MJ2 of FIG. 2, incorporating an IGBT T2 to which a diode D2 is reverse parallel connected and a bidirectional switch reverse blocking type IGBT T3, is of a configuration wherein the IGBT T2 emitter is connected to a terminal N, the reverse blocking type IGBT T3 emitter to a terminal M, and connection points of the IGBT T2 collector and reverse blocking type IGBT T3 collector to terminals U (U1 and U2).

FIGS. 9 and 10 show examples wherein one phase of a three phase inverter 1 is configured applying the module MJ1 of FIG. 1 and module MJ2 of FIG. 2. In FIG. 9, the terminals M are brought close together by disposing the module MJ1 of FIG. 1 and module MJ2 of FIG. 2 adjacent to each other, and it is possible to bring the terminal P, terminals M, and terminal N close to electrolytic capacitors C1 and C2 of a direct current unit. As a result of this, it is possible to reduce the length of the wires between the electrolytic capacitors C1 and C2 and the modules MJ1 and MJ2, as shown in FIG. 10, and also, it is possible to reduce the wire inductance of each wire using the mutual inductance occurring due to a potential Cp wire and potential Cm wire being brought close together, and to a potential Cn wire and potential Cm wire being brought close together, and it is possible to reduce the surge voltage when switching (ninth and tenth aspects of the invention).

Figure 11:
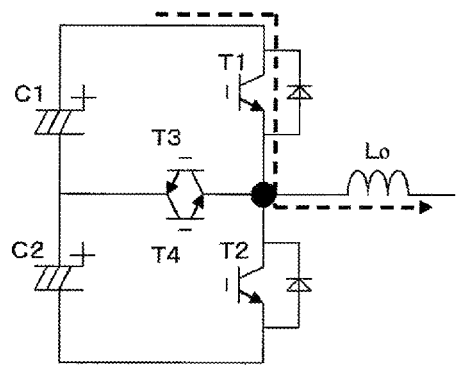
FIGS. 11A to 11D are illustrations of a commutation action of the current while the inverter is in operation.
Figure 11:
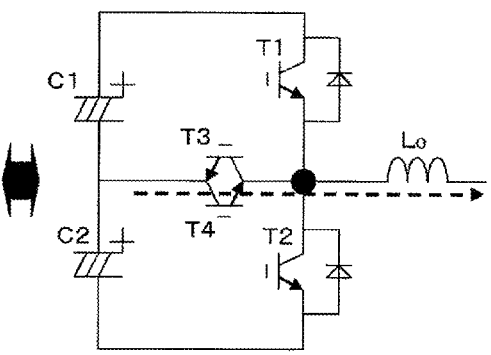
Figure 11:
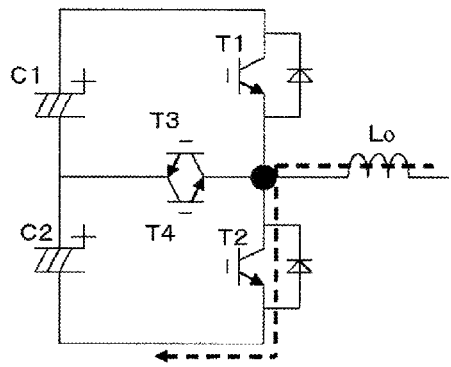
Figure 11:
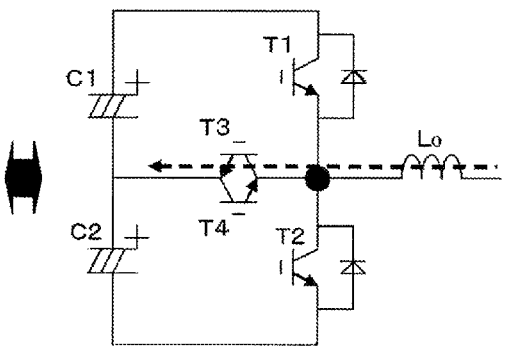

FIGS. 11A to 11D show a commutation action of the current while the inverter is in operation. FIGS. 11A and 11B show a case in which the current flows to the output side, and FIGS. 11C and 11D show a case in which the current is the reverse of that in FIGS. 11A and 11B. In FIGS. 11A and 11B, as the current flows through the IGBT T1 or T4 in accordance with an on-off action of the IGBT T1 (when the load power factor is roughly 1), the IGBT T1, diode D1, and reverse blocking type IGBT T4 are installed in the same module, as shown in FIG. 1. Also, in FIGS. 11C and 11D, as the current flows through the IGBT T2 or T3 in accordance with an on-off action of the IGBT T2 (when the load power factor is roughly 1), the IGBT T2, diode D2, and reverse blocking type IGBT T3 are installed in the same module, as shown in FIG. 2. It is also possible to apply the modules MJ1 and MJ2 in the same way to a converter circuit.

Working Example 2

Figure 3:
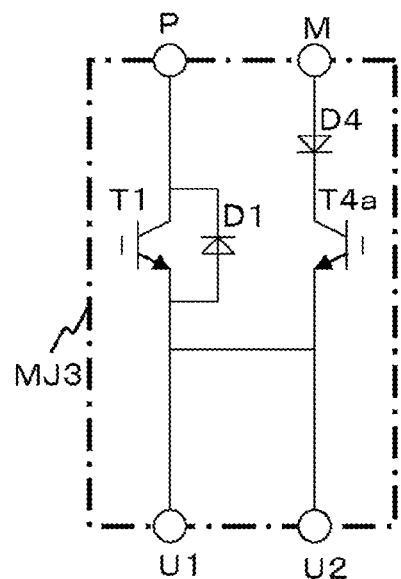
FIG. 3 shows a configuration of a power semiconductor module showing a third working example of the invention.
Figure 4:
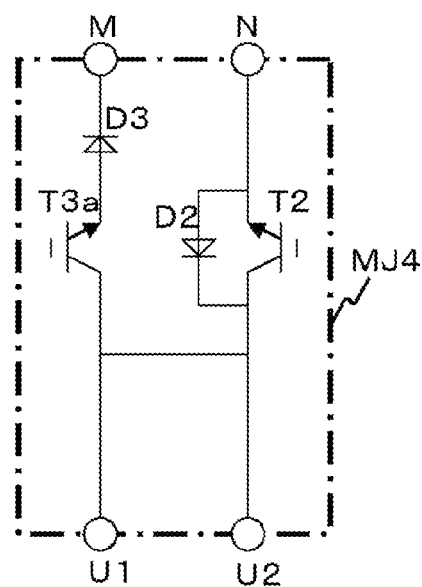
FIG. 4 shows a configuration of a power semiconductor module showing a fourth working example of the invention.

FIGS. 3 and 4 show a second working example of the invention. FIGS. 3 and 4 corresponding to third and fourth aspects of the invention respectively, the difference from the first working example is that the element connected to a potential Cm is an IGBT that does not have reverse blocking voltage. As bidirectional switch IGBTs T3$a$ and T4$a$ do not have reverse blocking voltage, diodes D3 and D4 are connected in series with the T3$a$ and T4$a$ respectively. Also, the shape of the module is that of the type of module in FIG. 20B.

A main circuit configuration and action when applying the modules to a three level inverter (a converter from a direct current to an alternating current) are the same as in FIGS. 9, 10 and 11A to 11D (ninth and eleventh aspects of the invention). Also, the functions are the same even in the event that the series connection order of the diode D3 and IGBT T3$a$, and of the diode D4 and IGBT T4$a$, are reversed. It is also possible to apply the modules in the same way to a converter circuit.

Working Example 3

Figure 5:
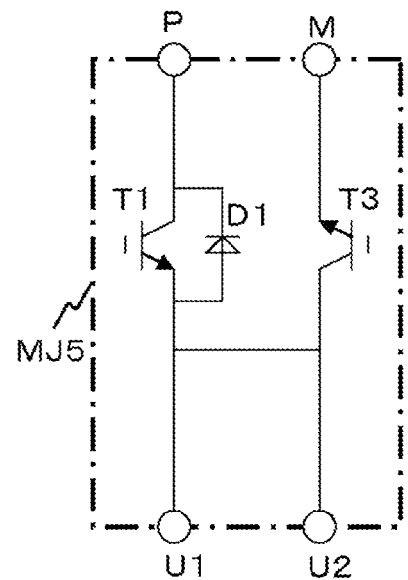
FIG. 5 shows a configuration of a power semiconductor module showing a fifth working example of the invention.
Figure 6:
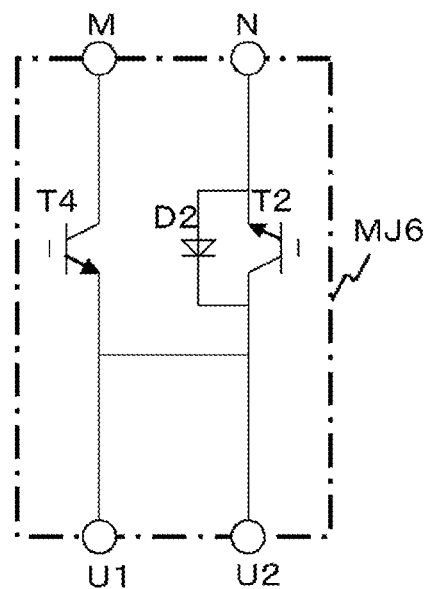
FIG. 6 shows a configuration of a power semiconductor module showing a sixth working example of the invention.
Figure 12:
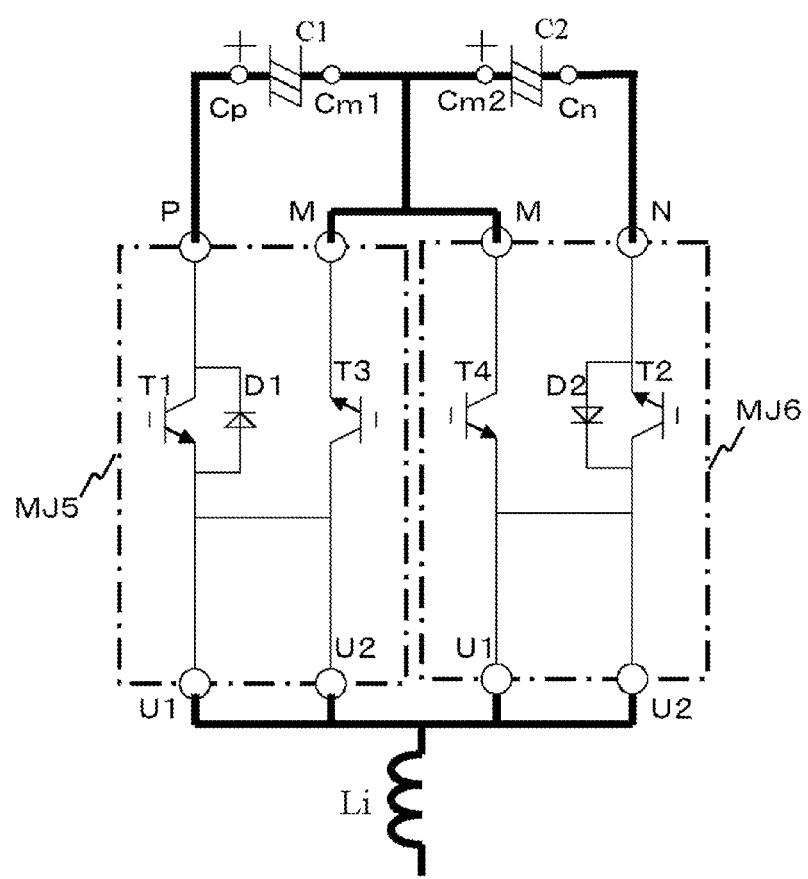
FIG. 12 shows a wiring example of modules and a direct current power source (capacitors) of the invention in a converter.
Figure 13:
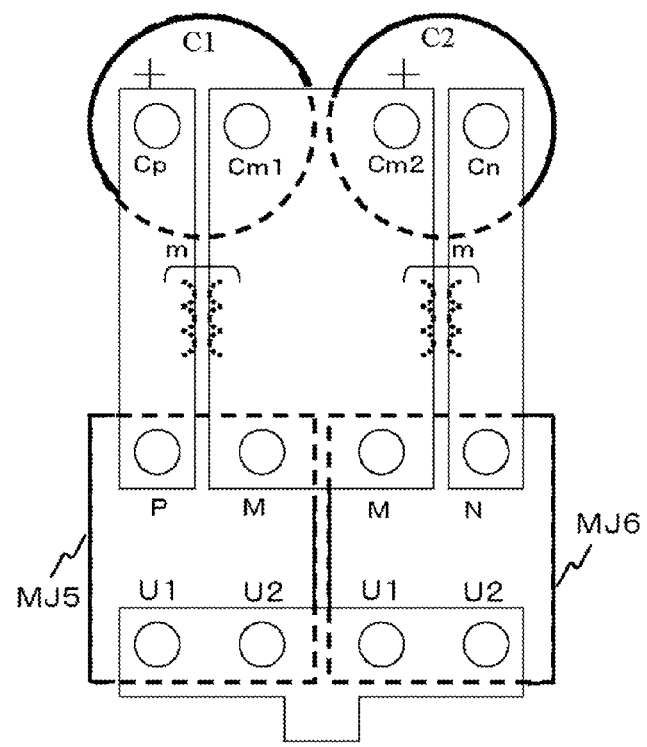
FIG. 13 shows a wiring structure example of modules and a direct current power source (capacitors) of the invention in the converter.

FIGS. 5 and 6 show a third working example of the invention. FIGS. 5 and 6 corresponding to fifth and sixth aspects of the invention respectively, IGBTs T3 and T4 connected to a potential Cm are elements having reverse blocking voltage, and the shape of the module is that of the type of module in FIG. 20B. FIGS. 12 and 13 show a working example when the modules are applied to a three level converter (a converter from an alternating current to a direct current).

A module MJ5 of FIG. 5, incorporating an IGBT T1 to which a diode D1 is reverse parallel connected and a reverse blocking type IGBT T3, is of a configuration wherein the IGBT T1 collector is connected to a terminal P, the IGBT T3 emitter to a terminal N, and connection points of the IGBT T1 emitter and IGBT T3 collector to terminals U (U1 and U2).

A module MJ6 of FIG. 6, incorporating an IGBT T2 to which a diode D2 is reverse parallel connected and a reverse blocking type IGBT T4, is of a configuration wherein the IGBT T2 emitter is connected to a terminal N, the IGBT T4 collector to a terminal M, and connection points of the IGBT T2 collector and IGBT T4 emitter to terminals U (U1 and U2).

FIGS. 12 and 13 show examples wherein one phase of a three level converter 1 is configured applying the module MJ5 of FIG. 5 and module MJ6 of FIG. 6. In FIG. 12, the terminals M are brought close together by bringing the modules MJ5 and MJ6 adjacent to each other, and it is possible to bring the terminal P, terminals M, and terminal N close to capacitors C1 and C2 of a direct current unit. As a result of this, it is possible to reduce the length of the wires between the electrolytic capacitors C1 and C2 and the modules, as shown in FIG. 13, and also, it is possible to reduce the wire inductance of each wire using the mutual inductance occurring due to a potential Cp1 wire and potential Cm wire being brought close together, and to a potential Cn2 wire and potential Cm wire being brought close together, and it is possible to reduce the surge voltage when switching (ninth and twelfth aspects of the invention).

FIGS. 14A to 14D show a commutation action of the current while the rectifier (converter) is in operation. FIGS. 14A and 14B show the commutation action when the current flows from the input side to the direct current power source side, and FIGS. 14C and 14D show the commutation action when the current is the reverse of that in FIGS. 14A and 14B. In FIGS. 14A and 14B, as the current flows through the IGBT T3 or diode D1 in accordance with an on-off action of the IGBT T3 (when the input power factor is roughly 1), the IGBT T3, IGBT T1, and diode D1 are installed in the same module, as shown in FIG. 5. Also, in FIGS. 14C and 14D, as the current flows through the IGBT T4 or diode D2 in accordance with an on-off action of the IGBT T4 (when the input power factor is roughly 1), the IGBT T4, IGBT T2, and diode D2 are installed in the same module, as shown in FIG. 6. It is also possible to apply the modules MJ5 and MJ6 in the same way to an inverter circuit.

Working Example 4

Figure 7:
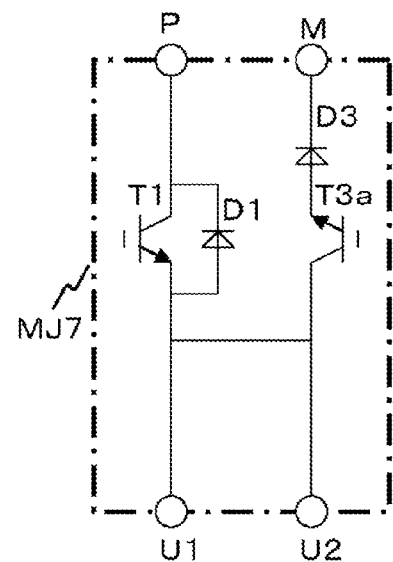
FIG. 7 shows a configuration of a power semiconductor module showing a seventh working example of the invention.
Figure 8:
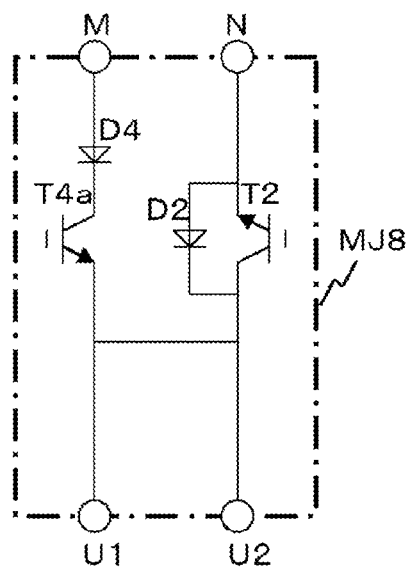
FIG. 8 shows a configuration of a power semiconductor module showing an eighth working example of the invention.

FIGS. 7 and 8 show a fourth working example of the invention. FIGS. 7 and 8 corresponding to seventh and eighth aspects of the invention respectively, the difference from the third working example is that the element connected to a potential Cm is an IGBT that does not have reverse voltage resistance. As bidirectional switch IGBTs T3a and T4a do not have reverse blocking voltage, diodes D3 and D4 are connected in series with the T3a and T4a respectively. Also, the shape of the module is that of the type of module in FIG. 20B.

A main circuit configuration and action when applying the modules to a three level converter (a converter from an alternating current to a direct current) are the same as in FIGS. 12, 13 and 14A to 14D (ninth and eleventh aspects of the invention). Also, the functions are the same even in the event that the series connection order of the diode D3 and IGBT T3a, and of the diode D4 and IGBT T4a, are reversed. It is also possible to apply the modules in the same way to an inverter circuit.

Working Example 5

Figure 15:
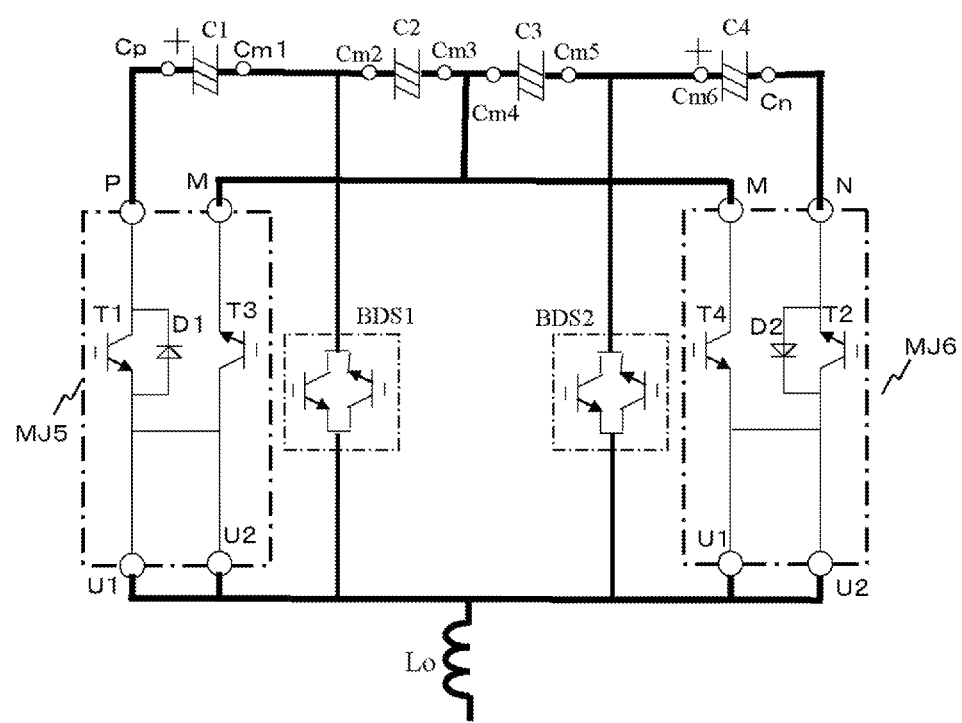
FIG. 15 is an example of an application of modules of the invention to a five level inverter.
Figure 16:
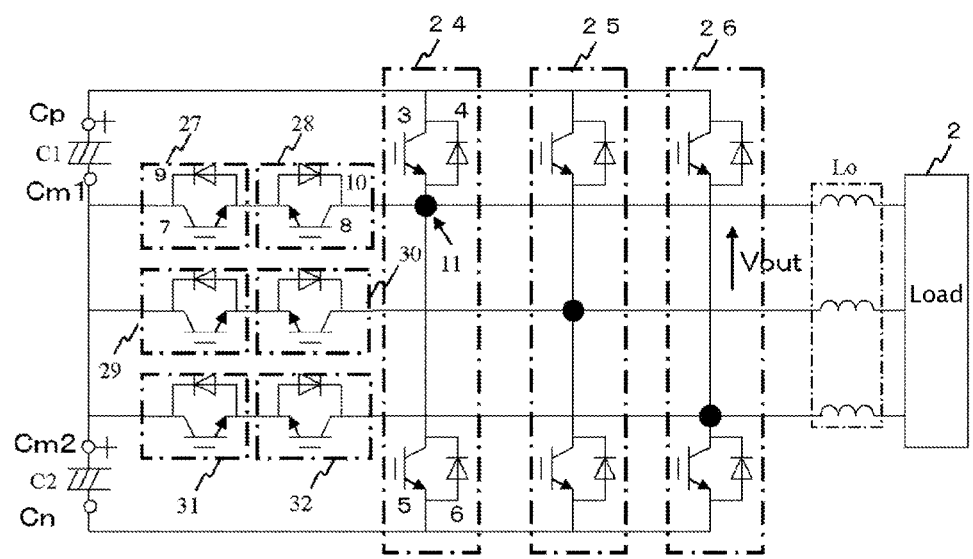
FIG. 16 is an example of a main circuit configuration of a three level inverter.
Figure 21:
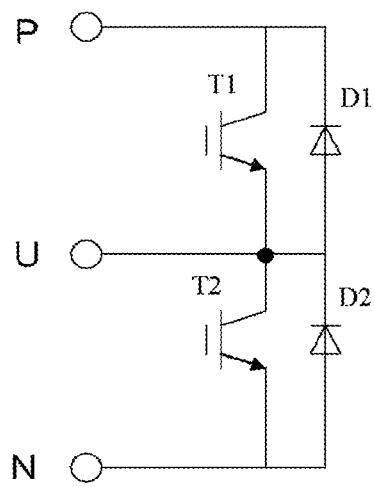
FIG. 21 is an internal circuit diagram of a power semiconductor module (a 2 in 1 type)
Figure 22:
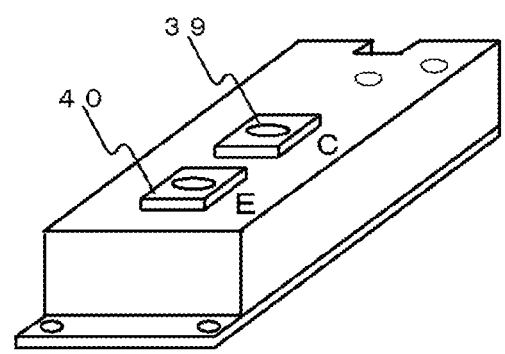
FIG. 22 is an external view of a power semiconductor module (a 1 in 1 type)
Figure 23:
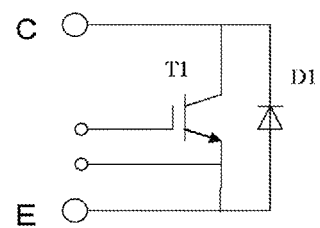
FIG. 23 is an internal circuit diagram of a power semiconductor module (a 1 in 1 type)
Figure 24:
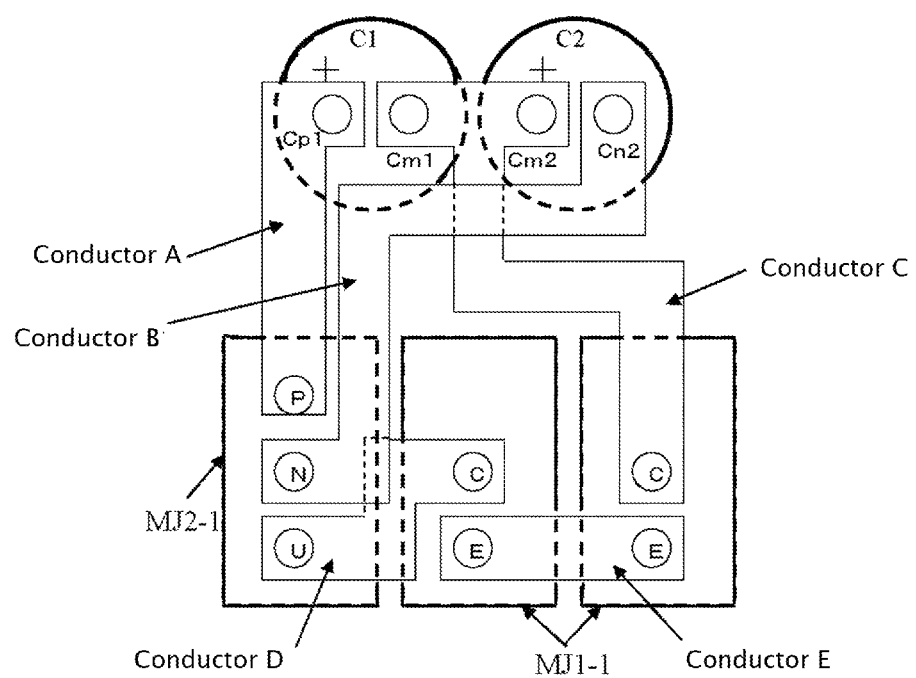
FIG. 24 is an example of a main circuit wiring structure of a three level converter using heretofore known modules.
Figure 25:
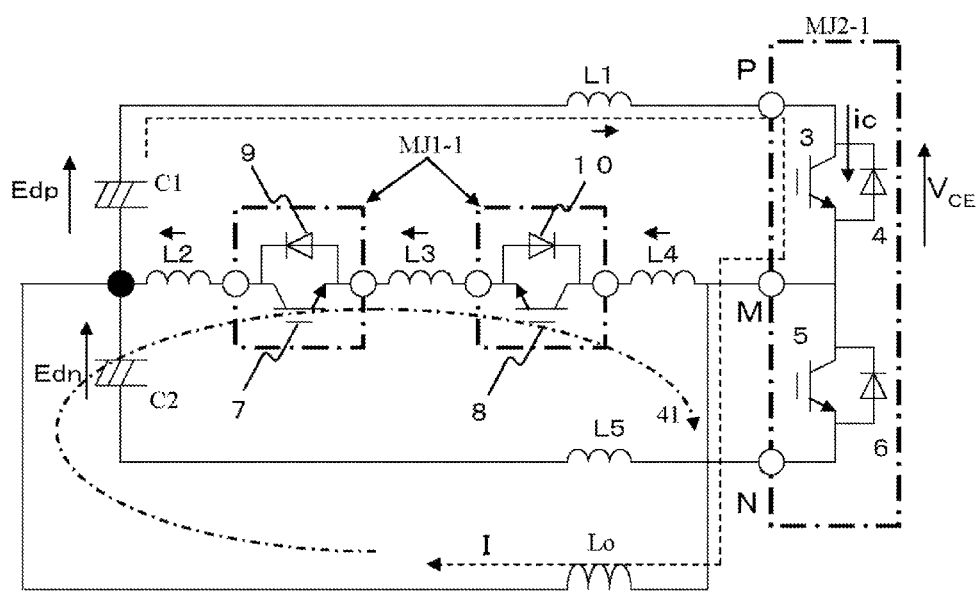
FIG. 25 shows a three level inverter one phase circuit and wire inductance.
Figure 26:
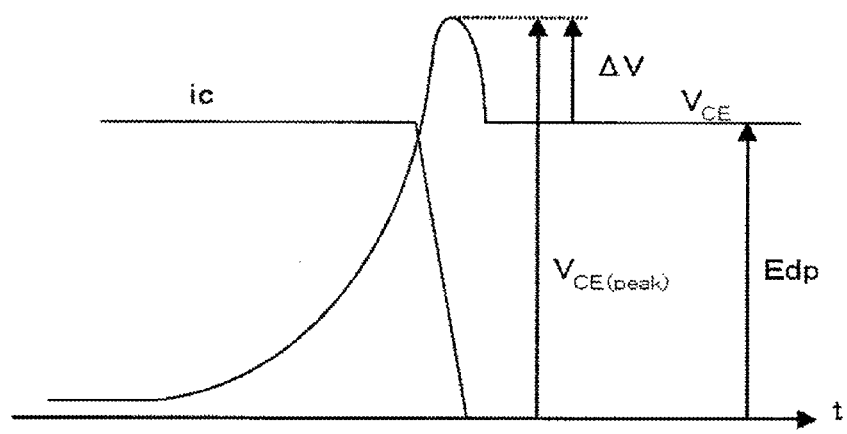
FIG. 26 shows an example of current and voltage waveforms when an IGBT is turned off.

FIG. 15 shows a fifth working example of the invention. It is an example of an application to a five level power converter circuit. It is a configuration of one phase of a five level inverter wherein capacitors C1 to C4 are connected in series as a direct current power source, five potentials are made with the highest potential at Cp and the lowest potential at Cn, and each potential is supplied to the load side via a reactor Lo in a switch circuit. As it is the three level inverter configuration shown in FIG. 9 made into a five level configuration, it is possible to apply the power semiconductor modules of the invention in the same way as in the three level inverter circuit. In the configuration of FIG. 15, the highest potential Cp, the lowest potential Cn, and intermediate potentials (Cm3 and Cm4) are output to the reactor Lo using the power semiconductor module MJ5 shown in FIG. 5 and the power semiconductor module MJ6 shown in FIG. 6, the second highest potentials (Cm5 and Cm6) are output to the reactor Lo through a bidirectional switch BDS2, and the fourth highest potentials (Cm1 and Cm2) are output to the reactor Lo through a bidirectional switch BDS1. The same effect as with the three level converter circuit is obtained by disposing the modules MJ5 and MJ6 adjacent to each other.

Also, in the same way as with the three level inverter and converter, it is possible to use each of the modules MJ1 and MJ2, MJ3 and MJ4, and MJ7 and MJ8, instead of the modules MJ5 and MJ6.

Provided that it is of a configuration wherein a divided direct current power source and a series circuit of two semiconductor switches connected between the direct current power sources are used, and a bidirectional switch is connected between the semiconductor switch series connection point and the direct current power source division point, the invention can be realized with either of a converter or an inverter.

The invention, being a proposal relating to a power semiconductor module applied to a multi-level power conversion system, and to an application thereof, can be applied to an uninterruptible power supply, a motor drive device, a reactive power compensation device, and the like.

This application is based on, and claims priority to, Japanese Patent Application No. 2010-087469, filed on Apr. 6, 2010. The disclosure of the priority application, in its entirety, including the drawings, claims, and the specification thereof, is incorporated herein by reference.

What is claimed is:

1. A power semiconductor module, applied to a multi-level converter circuit with three or more levels of voltage waveform, the converter circuit including a first IGBT and a second IGBT connected in series between a positive side potential and a negative side potential of a DC power supply equipped with a positive side potential, a negative side potential and an intermediate point potential, with a third IGBT and a fourth IGBT, each forming a bidirectional switch connected between the intermediate point potential of the DC power supply and the series connection point of the first IGBT and the second IGBT, the semiconductor module comprising:
a module package;
the first IGBT; and
the fourth IGBT,
wherein a diode is reverse parallel connected to the first IGBT and the fourth IGBT has a reverse blocking voltage, with an emitter of the fourth IGBT being connected to an emitter of the first IGBT,
wherein the first IGBT, the fourth IGBT and the diode are housed in the module package, and
wherein each of the collector of the first IGBT, the collector of the fourth IGBT, and connection points of the emitter of the first IGBT and the emitter of the fourth IGBT, is an external terminal on a side of the module package.

2. The power semiconductor module according to claim 1, wherein
external terminals drawn from the connection points of the first IGBT and second IGBT or from the connection points of the first IGBT and one end of the series circuit are installed on one edge side of the module package, and the other external terminals are installed on another edge side opposing the one edge side of the module package.

3. A semiconductor power conversion system, comprising:
the power semiconductor module according to claim 1 and a power semiconductor module applied to a multi-level converter circuit with three or more levels of voltage waveform, wherein a first IGBT to which a diode is reverse parallel connected and a second IGBT having reverse blocking voltage whose collector is connected to the collector of the first IGBT are housed in one package, and each of the emitter of the first IGBT, the emitter of the second IGBT, and the connection points of the collector of the first IGBT and the collector of the second IGBT, is an external terminal,
wherein external terminals drawn from the connection points of the first IGBT and second IGBT are installed on one edge side of the module package and the other external terminals are installed on another edge side of the module package opposing the one edge, are disposed adjacent to each other so that the terminals installed on the one edge side and the terminals installed on the other edge side face in the same respective directions.

4. A power semiconductor module, applied to a multi-level converter circuit with three or more levels of voltage waveform, the converter circuit including a first IGBT and a second IGBT connected in series between a positive side potential and a negative side potential of a DC power supply equipped with a positive side potential, a negative side potential and an intermediate point potential, with a third IGBT and a fourth IGBT, each forming a bidirectional switch connected between the intermediate point potential of the DC power supply and the series connection point of the first IGBT and the second IGBT, the semiconductor module comprising:
a module package;
the first IGBT; and
the fourth IGBT,
wherein a first diode is reverse parallel connected to the first IGBT and a series circuit of the fourth IGBT and a second diode are housed in the module package,
wherein each of the collector of the first IGBT, connection points of an emitter of the first IGBT and one end of the series circuit, and the other end of the series circuit, is an external terminal on a side of the module package.

5. A semiconductor power conversion system, comprising:
the power semiconductor module according to claim 4 and a power semiconductor module applied to a multi-level converter circuit with three or more levels of voltage waveform, wherein a first IGBT to which a first diode is reverse parallel connected and a series circuit of a second IGBT and a second diode are housed in one package, and each of the emitter of the first IGBT, the connection points of the collector of the first IGBT and one end of the series circuit, and the other end of the series circuit, is an external terminal,
wherein the external terminals drawn from the connection points of the first IGBT and one end of the series circuit are installed on one edge side of the module package and the other external terminals are installed on another edge side of the module package opposing the one edge, are disposed adjacent to each other so that the terminals installed on the one edge side and the terminals installed on the other edge side face in the same respective directions.

\* \* \* \* \*